United States Patent
Fujita (10) Patent No.: US 10,107,705 B2
(45) Date of Patent: Oct. 23, 2018

(54) FUEL CELL VEHICLE

(71) Applicant: TOYOTA JIDOSHA KABUSIKI KAISHA, Toyota-shi, Aichi-ken (JP)

(72) Inventor: Keisuke Fujita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/811,399

(22) Filed: Nov. 13, 2017

(65) Prior Publication Data

US 2018/0143095 A1 May 24, 2018

(30) Foreign Application Priority Data

Nov. 21, 2016 (JP) .................................. 2016-226185

(51) Int. Cl.
| | |
|---|---|
| *B60W 10/28* | (2006.01) |
| *G01L 27/00* | (2006.01) |
| *B60L 11/18* | (2006.01) |
| *F17C 13/02* | (2006.01) |

(52) U.S. Cl.
CPC ......... *G01L 27/005* (2013.01); *B60L 11/1881* (2013.01); *B60W 10/28* (2013.01); *F17C 13/025* (2013.01)

(58) Field of Classification Search
CPC ...... B60W 10/24; B60W 10/26; B60W 10/28; H01M 8/04
USPC ............................................ 180/65.29, 65.31
See application file for complete search history.

(56) References Cited

U.S. PATENT DOCUMENTS

| | | | | |
|---|---|---|---|---|
| 6,442,455 B1 * | 8/2002 | Kotre | ..................... | B60K 6/445 701/22 |
| 6,876,098 B1 * | 4/2005 | Gray, Jr. | .................. | B60K 5/08 290/40 D |
| 7,147,945 B2 * | 12/2006 | Balliet | .............. | H01M 8/04223 429/429 |
| 7,444,234 B2 * | 10/2008 | Bauerle | .................. | F02M 35/09 123/361 |
| 7,717,202 B2 * | 5/2010 | Brigham | .................. | B60K 6/32 180/65.265 |
| 7,793,620 B2 * | 9/2010 | Kotwicki | ............ | F02D 41/0027 123/1 A |

(Continued)

FOREIGN PATENT DOCUMENTS

JP 2013-177910 A 9/2013

*Primary Examiner* — Jeffrey J Restifo
(74) *Attorney, Agent, or Firm* — Finnegan, Henderson, Farabow, Garrett & Dunner, LLP (57) ABSTRACT

When a calibration starting condition of a pressure sensor is satisfied while a fuel cell vehicle is traveling, the fuel cell vehicle starts to travel by using electric power supplied from a secondary battery. In the fuel cell vehicle, a pressure sensor is calibrated based on hydrogen pressure in a hydrogen gas flow channel downstream of a pressure reducing valve after a shut-off valve of a hydrogen tank is closed, and the hydrogen in a hydrogen gas flow channel is exhausted until hydrogen pressure upstream of the pressure reducing valve and hydrogen pressure downstream of the pressure reducing valve become substantially equal to each other. The fuel cell vehicle travels by using electric power supplied from the secondary battery while the pressure sensor is being calibrated, so that calibration processing of the pressure sensor can be performed without causing a noise.

5 Claims, 4 Drawing Sheets

(56) References Cited

U.S. PATENT DOCUMENTS

| | | | | |
|---|---|---|---|---|
| 8,232,014 | B2* | 7/2012 | Arthur | H01M 8/04223 429/429 |
| 8,239,082 | B2* | 8/2012 | Tabatowski-Bush | B60W 10/26 701/22 |
| 8,679,691 | B2* | 3/2014 | Lang | H01M 8/04201 429/431 |
| 8,914,173 | B2* | 12/2014 | Biondo | B60L 1/003 180/65.265 |
| 8,951,684 | B2* | 2/2015 | Lerner | H01M 8/04223 429/429 |
| 9,225,028 | B2* | 12/2015 | Imanishi | H01M 8/04268 |
| 9,296,311 | B2* | 3/2016 | Kawase | B60L 11/1883 |
| 9,306,229 | B2* | 4/2016 | Miyata | H01M 8/04089 |
| 9,331,347 | B2* | 5/2016 | Matsumoto | H01M 8/04 |
| 9,358,900 | B2* | 6/2016 | Wake | B60L 1/003 |
| 9,428,178 | B2* | 8/2016 | Johri | B60W 10/26 |
| 9,499,157 | B2* | 11/2016 | Muller | G01C 21/26 |
| 9,543,600 | B2* | 1/2017 | Morita | H01M 8/04097 |
| 9,561,723 | B2* | 2/2017 | Oya | B60K 35/00 |
| 9,643,517 | B2* | 5/2017 | Watanabe | H01M 8/0491 |
| 9,682,701 | B2* | 6/2017 | Saito | B60W 20/50 |
| 9,774,049 | B2* | 9/2017 | Oh | H01M 8/04992 |
| 9,780,397 | B2* | 10/2017 | Hoshi | H01M 8/04619 |
| 9,843,059 | B2* | 12/2017 | Sato | H01M 8/04 |
| 9,847,538 | B2* | 12/2017 | Chikugo | H01M 8/0432 |
| 9,853,311 | B2* | 12/2017 | Okui | B60L 3/0053 |
| 9,876,242 | B2* | 1/2018 | Asai | H01M 8/04 |
| 9,956,885 | B2* | 5/2018 | Imanishi | H01M 8/04089 |
| 9,960,440 | B2* | 5/2018 | Asai | H01M 8/04776 |
| 9,979,035 | B2* | 5/2018 | Matsusue | H01M 8/0488 |
| 9,997,795 | B2* | 6/2018 | Pence | H01M 8/04126 |

* cited by examiner

FUEL CELL VEHICLE

INCORPORATION BY REFERENCE

The disclosure of Japanese Patent Application No. 2016-226185 filed on Nov. 21, 2016 including the specification, drawings and abstract is incorporated herein by reference in its entirety.

BACKGROUND

1. Technical Field

The present disclosure relates to a fuel cell vehicle.

2. Description of Related Art

A fuel cell is a power generator that directly converts chemical energy into electrical energy through an electrochemical reaction between hydrogen gas and oxidation gas. In a fuel cell vehicle mounting a fuel cell as an on-vehicle power source, hydrogen gas under high pressure supplied from a hydrogen tank storing hydrogen gas is reduced in pressure by a pressure reducing valve, and then the hydrogen gas reduced in pressure is supplied to the fuel cell. Some fuel cell vehicles of this type include a high-pressure sensor provided in a hydrogen gas flow channel from a hydrogen tank to a pressure reducing valve, and a low-pressure sensor provided in a hydrogen gas flow channel from the pressure reducing valve to a fuel cell. High-pressure sensors each have a wide measurement range, but have relatively low detection accuracy of pressure with respect to low-pressure sensors. Meanwhile, the low-pressure sensors each have a narrow measurement range, but have high detection accuracy of pressure. In a high-pressure sensor placed under high-pressure environment, measurement errors may successively increase. In light of the above-mentioned circumstances, Japanese Patent Application Publication No. 2013-177910 provides a method of calibrating a high-pressure sensor on the basis of hydrogen pressure detected by a low-pressure sensor by exhausting hydrogen gas in a hydrogen gas flow channel while a stopcock valve of a hydrogen tank is closed.

SUMMARY

Unfortunately, when calibration processing of a pressure sensor is performed while a fuel cell vehicle is stopped (e.g., when power generation of a fuel cell is stopped, or started up), a sound generated during the calibration processing may become noticeable to be felt as a noise.

Then, the present disclosure provides a fuel cell vehicle in which calibration processing of a pressure sensor can be performed without causing a noticeable sound.

A fuel cell vehicle according to the present disclosure includes: (i) a fuel cell that generates power by using an electrochemical reaction between hydrogen gas and oxidation gas; (ii) a hydrogen tank that supplies the hydrogen gas to the fuel cell through a hydrogen gas flow channel; (iii) a shut-off valve that performs supply and interruption of the hydrogen gas from the hydrogen tank to the fuel cell through the hydrogen gas flow channel; (iv) a pressure reducing valve that reduces hydrogen pressure in the hydrogen gas flow channel; (v) a pressure sensor that detects the hydrogen pressure in the hydrogen gas flow channel between the shut-off valve and the pressure reducing valve; (vi) a secondary battery that stores electric power generated by the fuel cell; and (vii) a control device that calibrates the pressure sensor based on the hydrogen pressure in the hydrogen gas flow channel downstream of the pressure reducing valve after the shut-off valve is closed and the hydrogen gas in the hydrogen gas flow channel is exhausted until the hydrogen pressure upstream of the pressure reducing valve and the hydrogen pressure downstream of the pressure reducing valve become substantially equal to each other when a calibration starting condition of the pressure sensor is satisfied during traveling of the fuel cell vehicle. While the pressure sensor is being calibrated, the fuel cell vehicle travels by using electric power supplied from the secondary battery.

According to the present disclosure, the fuel cell vehicle travels by using electric power supplied from the secondary battery while the pressure sensor is being calibrated, so that a sound generated during calibration processing can be prevented from being felt as a noise.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Figure 1:
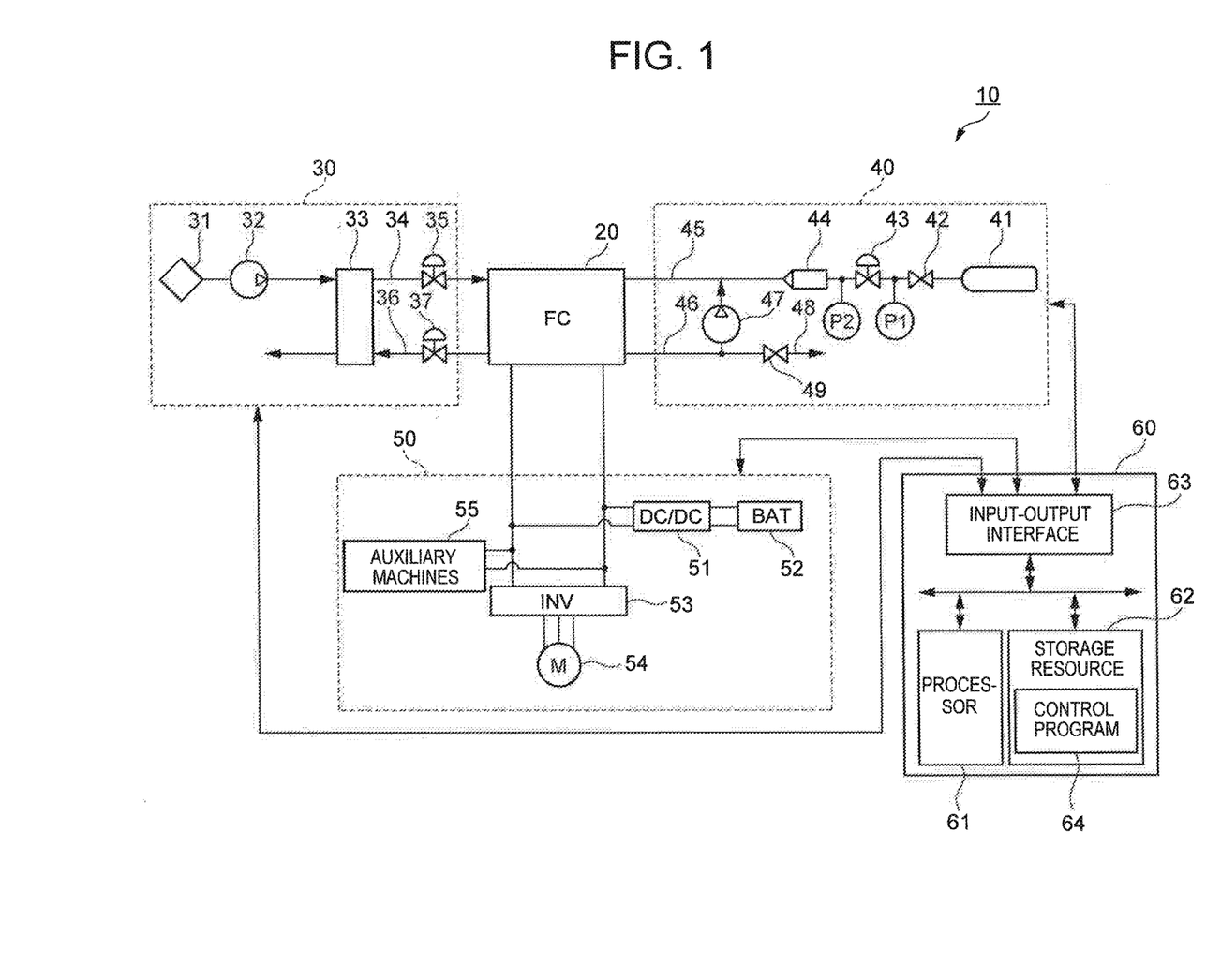
FIG. 1 is a block diagram illustrating a configuration of a fuel cell vehicle according to the present embodiment.

An embodiment according to the present disclosure will be described below with reference to each drawing. FIG. 1 is a block diagram illustrating a configuration of a fuel cell vehicle 10 according to the present embodiment. The fuel cell vehicle 10 includes: a fuel cell 20 that generates power by using an electrochemical reaction between hydrogen gas and oxidation gas; an oxidation gas supply system 30 that supplies air as oxidation gas to a cathode of the fuel cell 20; a hydrogen gas supply system 40 that supplies hydrogen gas to an anode of the fuel cell 20; an electric power system 50 that controls charge and discharge of electric power; and a control device 60 that controls operation of the fuel cell 20. The fuel cell 20 is a cell stack of a solid polymer electrolyte type formed by stacking a plurality of cells in series, for example, and serves as an on-vehicle power supply device. In the fuel cell 20, an oxidation reaction of Expression (1) occurs in the anode, and a reductive reaction of Expression (2) occurs in the cathode.

$$H_2 \rightarrow 2H^+ + 2e^- \qquad (1)$$

$$(1/2)O_2 + 2H^+ + 2e^- \rightarrow H_2O \qquad (2)$$

The oxidation gas supply system 30 includes an oxidation gas flow channel 34 through which oxidation gas to be supplied to the cathode of the fuel cell 20 flows, and an oxidation off-gas flow channel 36 through which oxidation off-gas discharged from the fuel cell 20 flows. The oxidation gas flow channel 34 is provided with an air compressor 32 configured to take in oxidation gas from the atmosphere through a filter 31, a humidifier 33 configured to humidify oxidation gas to be supplied to the cathode of the fuel cell 20, and a throttle valve 35 configured to adjust the amount of supply of oxidation gas. The oxidation off-gas flow channel 36 is provided with a back pressure valve 37 configured to adjust supply pressure of oxidation gas. The humidifier 33 humidifies oxidation gas by performing moisture exchange between the oxidation gas (dry gas) and oxidation off-gas (wet gas).

The hydrogen gas supply system 40 includes a hydrogen tank 41, a hydrogen gas flow channel 45 through which hydrogen gas to be supplied to the anode of the fuel cell 20 from the hydrogen tank 41 flows, a circulation flow channel 46 configured to return hydrogen off-gas discharged from the fuel cell 20 to the hydrogen gas flow channel 45 through a circulation pump 47, and an exhaust-drain flow channel 48 that is connected to the circulation flow channel 46 by branch connection. The hydrogen tank 41 includes a high pressure hydrogen tank and a hydrogen-storing alloy, for example, and stores hydrogen gas under high pressure (e.g., 35 MPa to 70 MPa). The shut-off valve 42 performs supply and interruption of hydrogen gas from the hydrogen tank 41 to the fuel cell 20 through the hydrogen gas flow channel 45. The shut-off valve 42 serves as a stopcock valve of the hydrogen tank 41.

The pressure of hydrogen gas is reduced to a pressure equal to or lower than 1000 kPa through a pressure reducing valve 43 and an injector 44, for example, to be supplied to the fuel cell 20. The pressure reducing valve 43 is a regulator that adjusts primary pressure upstream thereof to a preset secondary pressure, for example, and includes a mechanical pressure reducing valve that reduces primary pressure, and the like. The mechanical pressure reducing valve includes a case in which a back pressure chamber and a pressure adjusting chamber are formed across a diaphragm, and reduces primary pressure in the pressure adjusting chamber to predetermined pressure by using back pressure in the back pressure chamber to form secondary pressure. A pressure sensor P1 detects hydrogen pressure (primary pressure upstream of the pressure reducing valve 43) in the hydrogen gas flow channel 45 between the shut-off valve 42 and the pressure reducing valve 43. A pressure sensor P2 detects hydrogen pressure (secondary pressure downstream of the pressure reducing valve 43) in the hydrogen gas flow channel 45 downstream of the pressure reducing valve 43. The pressure sensor P1 is a high-pressure sensor that has a wide measurement range, and has detection accuracy lower than that of the pressure sensor P2. Meanwhile, the pressure sensor P2 is a low-pressure sensor that has a narrow measurement range, and has detection accuracy higher than that of the pressure sensor P1.

The injector 44 is an on-off valve of an electromagnetic driving type that can adjust a gas flow rate and gas pressure by separating a valve element from a valve seat by driving the valve element in a predetermined drive cycle using electromagnetic driving force. The injector 44 includes a valve seat with an injection hole for injecting gas fuel such as hydrogen gas, a nozzle body that supplies and guides the gas fuel to the injection hole, and a valve element that is accommodated and held in the nozzle body to be movable in an axial direction (gas flow direction) to open and close the injection hole. The exhaust-drain flow channel 48 is provided with an exhaust-drain valve 49. The exhaust-drain valve 49 is opened to discharge hydrogen off-gas containing impurities and moisture in the circulation flow channel 46 to the outside.

The electric power system 50 includes a DC-DC converter 51, a secondary battery 52, a traction inverter 53, a traction motor 54, and auxiliary machines 55. The DC-DC converter 51 has a function of increasing DC voltage applied from the secondary battery 52 and outputting it to the traction inverter 53, and a function of reducing voltage of DC power generated by the fuel cell 20, or of regenerative electric power recovered by the traction motor 54 through regenerative braking, and charging the secondary battery 52 with the voltage. Charge and discharge of the secondary battery 52 are controlled through these functions of the DC-DC converter 51. In addition, voltage conversion control by the DC-DC converter 51 controls operation points (output voltage and output current) of the fuel cell 20.

The secondary battery 52 serves as: a storage source of surplus electric power; a regenerative energy storage source during regenerative braking; and an energy buffer during load fluctuation caused by acceleration or deceleration of a fuel cell vehicle 10. For example, a secondary battery, such as a nickel-cadmium battery, a nickel-hydrogen battery, and a lithium secondary battery, is suitable for the secondary battery 52.

The traction inverter 53 is a PWM inverter driven by a pulse width modulation method, for example, and converts DC voltage output from the fuel cell 20 or the secondary battery 52 into three-phase AC voltage in response to a control command from the control device 60 to control rotational torque of the traction motor 54. The traction motor 54 is a three-phase AC motor, for example, and serves as a power source of the fuel cell vehicle 10.

The auxiliary machines 55 is a general name for each of motors (e.g., a power source such as a pump group) disposed in the corresponding portions of the fuel cell vehicle 10, an inverter group configured to drive the motors above, and various on-vehicle auxiliary machine groups (e.g., an air compressor, an injector, a cooling water circulation pump, a radiator, and the like).

The control device 60 is an electronically controlled unit including a processor 61, a storage resource 62, and an input-output interface 63. The processor 61 interprets and executes a control program 64 stored in the storage resource 62, and inputs and outputs a signal to control each system (the oxidation gas supply system 30, the hydrogen gas supply system 40, and the electric power system 50) of the fuel cell vehicle 10 through the input-output interface 63. When receiving a seizure signal output from an ignition switch, the control device 60 starts operation of the fuel cell 20, for example, and acquires required electric power on the basis of an accelerator operation amount signal output from an accelerator sensor, a vehicle speed signal output from a vehicle speed sensor, and the like. The required electric power is a total value of vehicle traveling electric power and auxiliary machine electric power. The auxiliary machine electric power includes: electric power consumed by the on-vehicle auxiliary machine group (e.g., the humidifier, the air compressor, the hydrogen pump, the cooling water circulation pump, and the like); electric power consumed by equipment necessary for vehicle traveling (a transmission, a wheel control device, a steering gear, a suspension, and the like); and electric power consumed by equipment (an air conditioner, a lighting fixture, audio equipment, and the like) disposed in an occupant space, for example. The control device 60 determines an allocation of output electric power to each of the fuel cell 20 and the secondary battery 52, and calculates a power generation command value, and also controls the oxidation gas supply system 30 and the hydrogen gas supply system 40 so as to cause the amount of power generation of the fuel cell 20 to coincide with target electric power. In addition, the control device 60 controls the DC-DC converter 51 so as to adjust output voltage of the fuel cell 20, thereby controlling operation points (output voltage and output current) of the fuel cell 20. The control device 60 outputs an AC voltage command value of each phase, U-phase, V-phase, and W-phase to the traction inverter 53 as a switching command to acquire target torque in accordance with an accelerator operation amount, for example, thereby controlling output torque and rotation speed of the traction motor 54.

Figure 2:
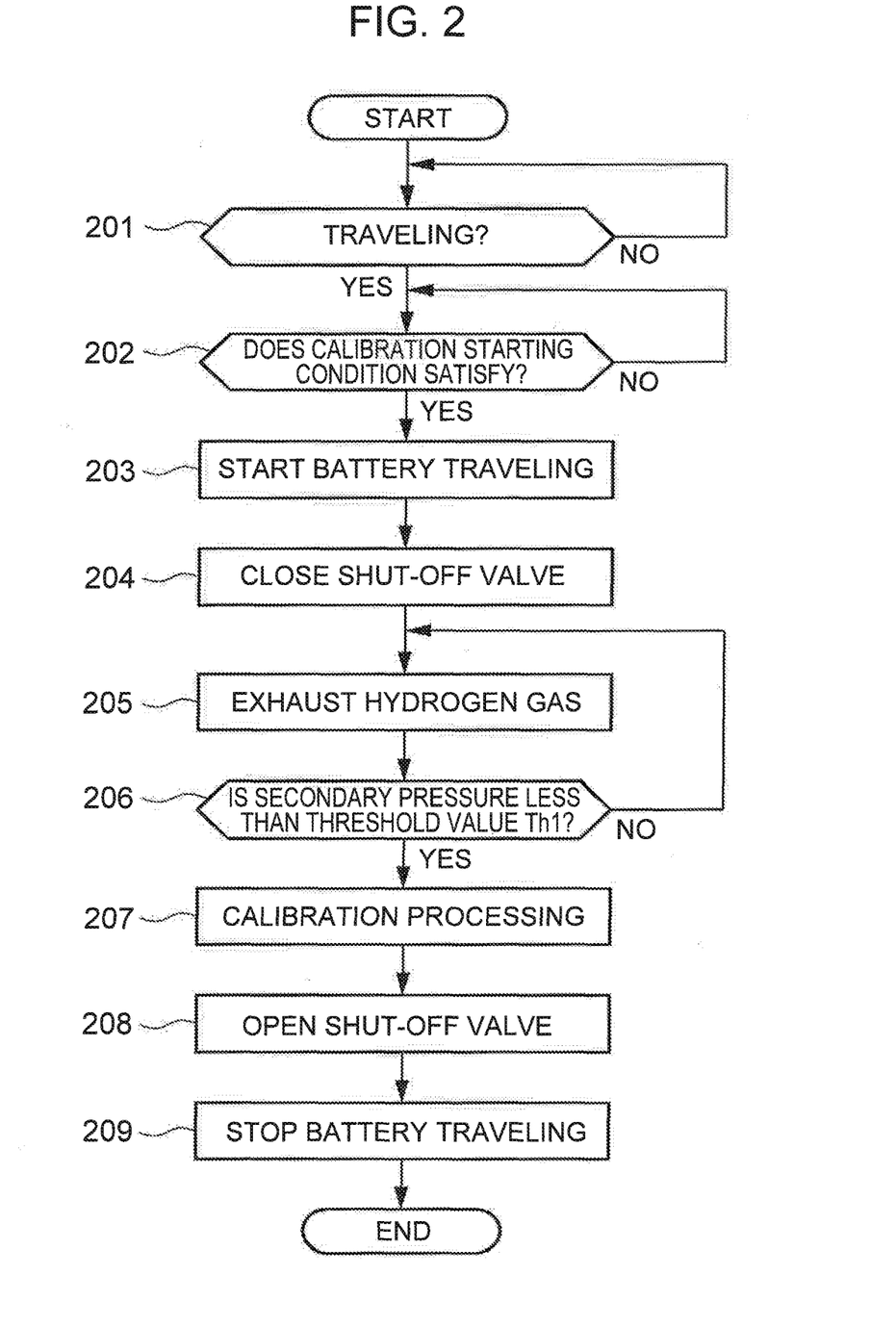
FIG. 2 is a flowchart showing a flow of first calibration processing of the pressure sensor according to the present embodiment.
Figure 3:
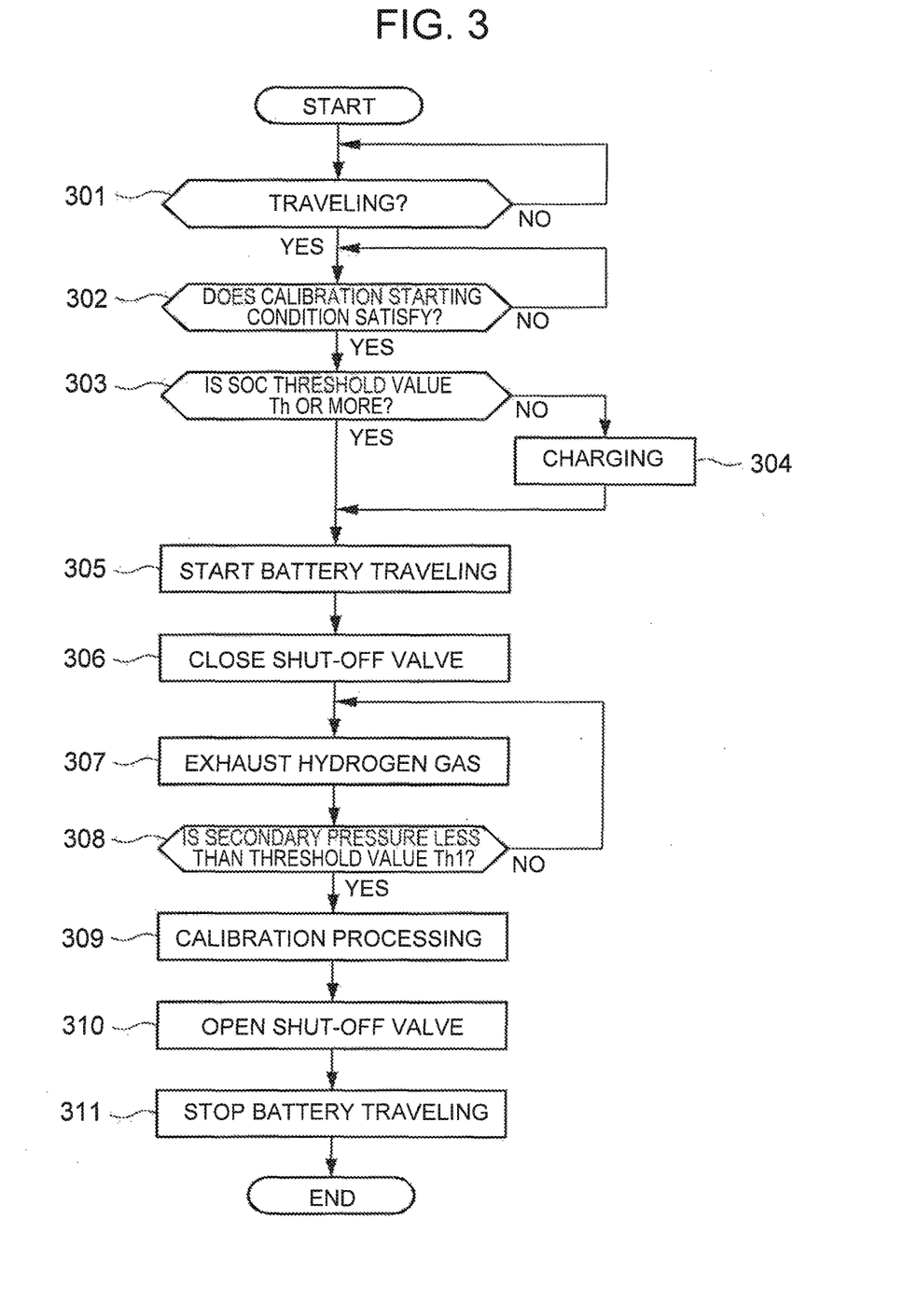
FIG. 3 is a flowchart showing a flow of second calibration processing of the pressure sensor according to the present embodiment.
Figure 4:
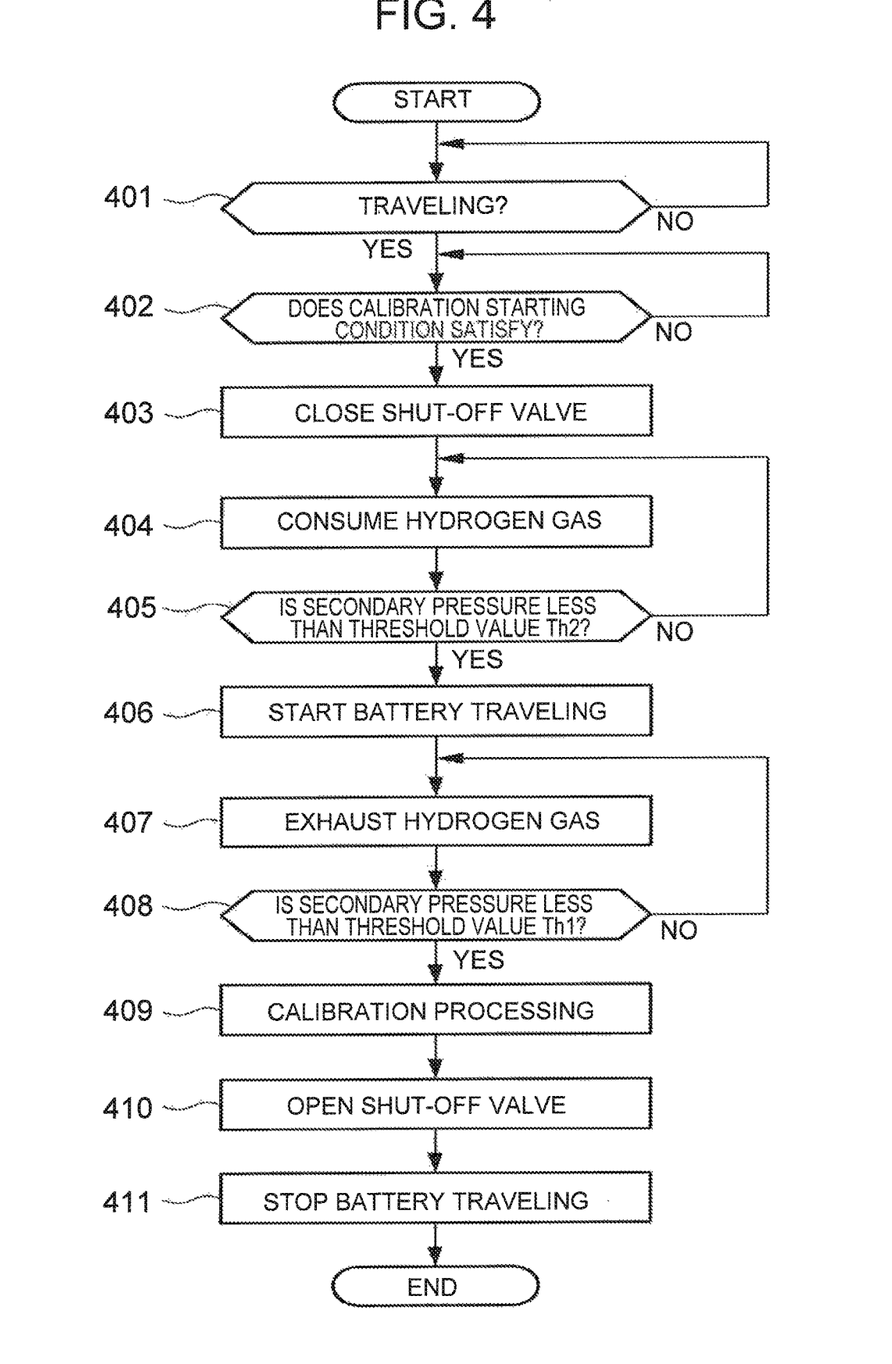
FIG. 4 is a flowchart showing a flow of third calibration processing of the pressure sensor according to the present embodiment.

Subsequently, calibration processing of the pressure sensor P1 will be described with reference to FIGS. 2 to 4. Steps 201 to 209 shown in FIG. 2, steps 301 to 311 shown in FIG. 3, and steps 401 to 411 shown in FIG. 4, are invoked as sub routines in the control program 64 and then are executed. The control program 64 includes a software module to execute each step shown in FIGS. 2 to 4. While a function of this kind of software module is achieved by collaboration between the processor 61 and the control program 64, an equivalent function may be achieved by using a dedicated hardware resource (e.g., an integrated circuit for a specific application), firmware, or the like.

First, first calibration processing of the pressure sensor P1 will be described with reference to FIG. 2. The control device 60 determines whether the fuel cell vehicle 10 is traveling by a method for reading out a vehicle speed signal output from the vehicle speed sensor, for example (step 201). When the fuel cell vehicle 10 is traveling (YES at step 201), the control device 60 determines whether a calibration starting condition of the pressure sensor P1 is satisfied (step 202). The control device 60 predicts a measurement error of the pressure sensor P1 in accordance with map data or prediction expression that is preliminarily stored in the storage resource 62, on the basis of history information on hydrogen pressure detected by the pressure sensor P1, temperature in the hydrogen tank 41, outside-air temperature, and the like, and determines that the calibration starting condition of the pressure sensor P1 is satisfied when the predicted measurement error exceeds a threshold value.

When the calibration starting condition of the pressure sensor P1 is satisfied (YES at step 202), the control device 60 switches an electric power supply source of the traction motor 54 from the fuel cell 20 to the secondary battery 52 to start battery traveling (step 203). Subsequently, the control device 60 causes the shut-off valve 42 of the hydrogen tank 41 to close (fully closed) (step 204) to interrupt hydrogen supply to the hydrogen gas flow channel 45.

Subsequently, the control device 60 causes hydrogen gas in the hydrogen gas flow channel 45 to be exhausted from the injector 44 through the exhaust-drain flow channel 48 by opening the injector 44 (step 205), and determines whether hydrogen pressure (secondary pressure downstream of the pressure reducing valve 43) detected by the pressure sensor P2 is less than a threshold value Th1 (step 206). The threshold value Th1 is hydrogen pressure downstream of the pressure reducing valve 43 when hydrogen pressure upstream of the pressure reducing valve 43 becomes substantially equal to the hydrogen pressure downstream of the pressure reducing valve 43. When most of the hydrogen gas in the hydrogen gas flow channel 45 is exhausted, atmospheric pressure can be used as the threshold value Th1, for example.

When hydrogen pressure detected by the pressure sensor P2 decreases to less than the threshold value Th1 (YES at step 206), the control device 60 calibrates the pressure sensor P1 on the basis of hydrogen pressure in the hydrogen gas flow channel 45 downstream of the pressure reducing valve 43 (step 207). The hydrogen pressure in the hydrogen gas flow channel 45 downstream of the pressure reducing valve 43 is detected by the pressure sensor P2 to calibrate the pressure sensor P1 in this embodiment. However, hydrogen pressure detected by the pressure sensor P2 is not necessarily used when the hydrogen gas in the hydrogen gas flow channel 45 is exhausted until the hydrogen pressure in the hydrogen gas flow channel 45 becomes atmospheric pressure, and then the pressure sensor P1 may be calibrated on the basis of atmospheric pressure, for example. It can be determined whether the pressure downstream of the shut-off valve 42 is atmospheric pressure based on the opening period of the injector 44. In this case, the pressure sensor P2 may not be provided in the fuel cell vehicle 10. As described above, in step 207, the calibration processing of the pressure sensor P1 is performed such that hydrogen pressure detected by pressure sensor P1 coincides with hydrogen pressure detected by the pressure sensor P2 or atmospheric pressure.

When the calibration processing of the pressure sensor P1 is finished, the control device 60 causes the shut-off valve 42 of the hydrogen tank 41 to open (fully open) (step 208) to restart hydrogen supply to the hydrogen gas flow channel 45, as well as stops battery traveling by switching the electric power supply source of the traction motor 54 from the secondary battery 52 to the fuel cell 20 (step 209).

As described above, the fuel cell vehicle 10 travels by using electric power supplied from the secondary battery 52 while the pressure sensor P1 is being calibrated, so that a sound generated during calibration processing of the pressure sensor P1 can be prevented from being felt as a noise.

Subsequently, second calibration processing of the pressure sensor P1 will be described with reference to FIG. 3. Steps 301, 302, 305 to 311 are identical to steps 201 to 209, respectively, so that detailed description of step 301, 302, 305 to 311 is eliminated.

When the calibration starting condition of the pressure sensor P1 is satisfied (YES at step 302), the control device 60 determines whether a state of charge of the secondary battery 52 is a threshold value Th or more (step 303). The threshold value Th is the amount of charge of the secondary battery 52 required to allow the fuel cell vehicle 10 to travel by using electric power supplied from the secondary battery 52. When a state of charge of the secondary battery 52 is less than the threshold value Th (NO at step 303), the control device 60 controls the secondary battery 52 so as to be charged with electric power generated by the fuel cell 20 until the state of charge of the secondary battery 52 reaches the threshold value Th (step 304).

As described above, when the state of charge of the secondary battery 52 is less than the threshold value Th at the time when the calibration starting condition of the pressure sensor P1 is satisfied, battery traveling is started after the secondary battery 52 is charged with electric power generated by the fuel cell 20 until the state of charge of the secondary battery 52 reaches the threshold value Th, thereby enabling adequate traveling performance to be secured.

Subsequently, third calibration processing of the pressure sensor P1 will be described with reference to FIG. 4. The control device 60 determines whether the fuel cell vehicle 10 is traveling by a method for reading out a vehicle speed signal output from the vehicle speed sensor, for example (step 401). When the fuel cell vehicle 10 is traveling (YES at step 401), the control device 60 determines whether a calibration starting condition of the pressure sensor P1 is satisfied (step 402).

When the calibration starting condition of the pressure sensor P1 is satisfied (YES at step 402), the control device 60 causes the shut-off valve 42 of the hydrogen tank 41 to close (fully closed) (step 403) to reduce hydrogen pressure in the hydrogen gas flow channel 45 through consumption of hydrogen gas remaining in the hydrogen gas flow channel 45 by the fuel cell 20 (step 404).

The control device 60 determines whether hydrogen pressure (secondary pressure downstream of the pressure reducing valve 43) detected by the pressure sensor P2 is less than a threshold value Th2 (step 405). The threshold value Th2 is threshold pressure required to allow the fuel cell vehicle 10 to travel by using electric power generated by the fuel cell 20 through consumption of hydrogen gas remaining in the hydrogen gas flow channel 45. Until hydrogen pressure detected by the pressure sensor P2 decreases to less than the threshold value Th2 after the shut-off valve 42 of the hydrogen tank 41 is closed, the control device 60 controls the fuel cell vehicle 10 such that the fuel cell vehicle 10 travels by using electric power generated by the fuel cell 20.

When hydrogen pressure detected by the pressure sensor P2 decreases to less than the threshold value Th2 (YES at step 405), the control device 60 switches an electric power supply source of the traction motor 54 from the fuel cell 20 to the secondary battery 52 to start battery traveling (step 406). Subsequently, the control device 60 causes hydrogen gas in the hydrogen gas flow channel 45 to be exhausted from the injector 44 through the exhaust-drain flow channel 48 (step 407), and determines whether hydrogen pressure (secondary pressure downstream of the pressure reducing valve 43) detected by the pressure sensor P2 is less than the threshold value Th1 (step 407).

When hydrogen pressure detected by the pressure sensor P2 decreases to less than the threshold value Th1 (YES at step 408), the control device 60 calibrates the pressure sensor P1 on the basis of hydrogen pressure in the hydrogen gas flow channel 45 downstream of the pressure reducing valve 43 (step 409).

When the calibration processing of the pressure sensor P1 is finished, the control device 60 causes the shut-off valve 42 of the hydrogen tank 41 to open (fully open) (step 410) to restart hydrogen supply to the hydrogen gas flow channel 45, as well as stops battery traveling by switching the electric power supply source of the traction motor 54 from the secondary battery 52 to the fuel cell 20 (step 411).

As described above, hydrogen gas remaining in the hydrogen gas flow channel 45 can be used for traveling energy by closing the shut-off valve 42 of the hydrogen tank 41, so that deterioration in fuel consumption of hydrogen gas can be reduced.

The embodiment described above is for easy understanding of the present disclosure, and is not to be interpreted by limiting the present disclosure. The embodiment can be changed or modified, and the present disclosure includes its equivalent. That is, a modification in which a person skilled in the art appropriately makes a design change to the embodiment is included in the scope of the present disclosure. For example, each element provided in the embodiment, and its placement, material, conditions, shape, size, and the like, are not limited to those described above, and may be appropriately changed. In the embodiment described above, when only the first calibration processing or the second calibration processing is performed, the pressure sensor P2 may be eliminated from the fuel cell vehicle 10.

In addition, a positional relationship, such as up and down, left and right, is not limited to a ratio illustrated unless otherwise noted. Further, each of elements provided in the embodiment may be combined with each other as far as technically possible, so that a combination of the elements is also included in the scope of the present disclosure.

What is claimed is:

1. A fuel cell vehicle comprising:
   a fuel cell that generates power by using an electrochemical reaction between hydrogen gas and oxidation gas;
   a hydrogen tank that supplies the hydrogen gas to the fuel cell through a hydrogen gas flow channel;
   a shut-off valve that performs supply and interruption of the hydrogen gas from the hydrogen tank to the fuel cell through the hydrogen gas flow channel;
   a pressure reducing valve that reduces hydrogen pressure in the hydrogen gas flow channel;
   a first pressure sensor that detects the hydrogen pressure in the hydrogen gas flow channel between the shut-off valve and the pressure reducing valve;
   a secondary battery that stores electric power generated by the fuel cell; and
   a control device configured to calibrate the first pressure sensor based on the hydrogen pressure in the hydrogen gas flow channel downstream of the pressure reducing valve after the shut-off valve is closed and the hydrogen in the hydrogen gas flow channel is exhausted until the hydrogen pressure upstream of the pressure reducing valve and the hydrogen pressure downstream of the pressure reducing valve become substantially equal to each other when a calibration starting condition of the first pressure sensor is satisfied during traveling of the fuel cell vehicle,
   wherein while the first pressure sensor is being calibrated, the fuel cell vehicle travels by using electric power supplied from the secondary battery.

2. The fuel cell vehicle according to claim 1, wherein
   when a state of charge of the secondary battery when the calibration starting condition of the first pressure sensor is satisfied while the fuel cell vehicle is traveling is less than a threshold value required to allow the fuel cell vehicle to travel by using electric power supplied from the secondary battery, the control device controls the secondary battery so as to be charged with the electric power generated by the fuel cell until the state of charge of the secondary battery reaches the threshold value, and
   after the state of charge of the secondary battery reaches the threshold value, the control device closes the shut-off valve and calibrates the first pressure sensor based on the hydrogen pressure in the hydrogen gas flow channel downstream of the pressure reducing valve after the hydrogen gas in the hydrogen gas flow channel is exhausted until the hydrogen pressure upstream of the pressure reducing valve and the hydrogen pressure downstream of the pressure reducing valve become substantially equal to each other.

3. The fuel cell vehicle according to claim 1, further comprising a second pressure sensor that detects the hydrogen pressure in the hydrogen gas flow channel downstream of the pressure reducing valve,
   wherein when the calibration starting condition of the first pressure sensor is satisfied while the fuel cell vehicle is traveling, until the hydrogen pressure detected by the second pressure sensor reduces below a threshold pressure required to allow the fuel cell vehicle to travel by using electric power generated by the fuel cell through consumption of the hydrogen gas remaining in the hydrogen gas flow channel after the shut-off valve is closed, the control device controls the fuel cell vehicle so as to travel by using electric power generated by the fuel cell, and when the hydrogen pressure detected by the second pressure sensor reduces below the threshold pressure, the control device is configured to: (i) calibrate the first pressure sensor based on the hydrogen pressure detected by the second pressure sensor after the hydrogen gas in the hydrogen gas flow channel is exhausted until the hydrogen pressure upstream of the pressure reducing valve and the hydrogen pressure downstream of the pressure reducing valve become substantially equal to each other; and (ii) control the fuel cell vehicle such that the fuel cell vehicle travels by using electric power supplied from the secondary battery.

4. The fuel cell vehicle according to claim 1, wherein the pressure reducing valve is provided in the hydrogen gas flow channel downstream of the shut-off valve.

5. A fuel cell vehicle comprising:

a fuel cell that generates power by using an electrochemical reaction between hydrogen gas and oxidation gas;

a hydrogen tank that supplies the hydrogen gas to the fuel cell through a hydrogen gas flow channel;

a shut-off valve that performs supply and interruption of the hydrogen gas from the hydrogen tank to the fuel cell through the hydrogen gas flow channel;

a pressure reducing valve that reduces hydrogen pressure in the hydrogen gas flow channel;

a first pressure sensor that detects the hydrogen pressure in the hydrogen gas flow channel between the shut-off valve and the pressure reducing valve;

a secondary battery that stores electric power generated by the fuel cell; and a control device programmed to calibrate the first pressure sensor based on the hydrogen pressure in the hydrogen gas flow channel downstream of the pressure reducing valve after the shut-off valve is closed and the hydrogen in the hydrogen gas flow channel is exhausted until the hydrogen pressure upstream of the pressure reducing valve and the hydrogen pressure downstream of the pressure reducing valve become substantially equal to each other when a calibration starting condition of the first pressure sensor is satisfied during traveling of the fuel cell vehicle, wherein while the first pressure sensor is being calibrated, the fuel cell vehicle travels by using electric power supplied from the secondary battery.

* * * * *